United States Patent [19]

Frye

[11] 4,043,959

[45] Aug. 23, 1977

[54] POLYOLEFIN CONTAINING EMULSION ADHESIVES

[75] Inventor: David R. Frye, Pittsburg, Tex.

[73] Assignee: Eastman Kodak Company, Rochester, N.Y.

[21] Appl. No.: 580,081

[22] Filed: May 22, 1975

[51] Int. Cl.$^2$ ............................................. C08L 23/30
[52] U.S. Cl. ......................... 260/27 R; 260/29.6 NR; 260/29.6 RB
[58] Field of Search .......... 260/27 R, 94.9 GC, 23 H, 260/29.6 NR, 29.6 RB

[56] References Cited

U.S. PATENT DOCUMENTS

| 2,664,378 | 12/1953 | Heller | 260/27 R |
|---|---|---|---|
| 2,874,137 | 2/1959 | Pisanchyn et al. | 260/27 R |
| 2,928,797 | 3/1960 | Brunson et al. | 260/27 R |
| 3,247,141 | 4/1966 | Stryker et al. | 260/27 R |
| 3,775,146 | 11/1973 | Reckziegel et al. | 260/27 R |
| 3,893,883 | 7/1975 | Higuchi et al. | 260/27 R |

OTHER PUBLICATIONS

Def. Pub. published in 860 O.G. 1008 Brunson published 3/25/69.
Def. Pub. T869,011 Brunson publ. 12/16/69, (260/27 R).
Def. Pub. T900,016 Dickert et al. publ. 7/25/72, (260/27 R).

Primary Examiner—M. J. Welsh
Attorney, Agent, or Firm—Clyde L. Tootle; Daniel B. Reece, III

[57] ABSTRACT

The polyolefin containing emulsion adhesives of the present invention comprise an aqueous emulsion of a blend comprising an oxidized polyethylene, a tackifying resin and emulsifiers. The emulsion adhesives have a novel combination of properties including a long shelf life, are not adversely affected by freezing, and provide adhesive bonds having good shear strength and relatively low tensile strength.

6 Claims, No Drawings

POLYOLEFIN CONTAINING EMULSION ADHESIVES

This invention relates to polyolefin containing emulsion adhesives. One aspect of this invention relates to polyolefin containing emulsion adhesives having a unique combination of properties. Another aspect of the invention relates to polyolefin containing emulsion adhesives which provide an adhesive bond having good shear strength and relatively low tensile strength.

Emulsion adhesives such as paste and glues are widely used in various applications for bonding porous substrates such as paper and wood. Although these adhesives have many desirable properties, they have certain deficiencies which adversely affect their use. For example, the shelf life of these adhesives is inadequate (less than 1 year) and they will not survive a freeze-thaw cycle. Consequently, these adhesives must be used in a relatively short period of time and protected from the elements prior to use. In addition, many of these adhesives do not have the combination of strength properties necessary in certain applications. One such application where emulsion adhesives have been used is as a palletizing adhesive. In this application adhesive is applied between layers of bags or boxes to prevent shifting or sliding during shipment. This requires an adhesive with good shear strength. However, when the bags or boxes are unstacked it is desirable that the adhesive bond fail rather than produce appreciable container tear. This requires an adhesive with low tensile strength. Therefore, it would be an advance in the state of the art to provide an emulsion adhesive which has a long shelf life, is not affected by freezing, and provides a bond having good shear strength and relatively low tensile strength.

It is therefore an object of the present invention to provide a novel emulsifiable polyolefin adhesive.

Another object of this invention is a polyethylene containing emulsion adhesive having a novel combination of properties.

A still further object of the invention is to provide a polyethylene containing emulsion adhesive which provides an adhesive bond having good shear strength and low tensile strength.

In accordance with this invention it has been found that compositions comprised of oxidized polyethylene, a tackifying resin, emulsifiers, and water provide emulsion adhesives. These emulsion adhesives provide a novel combination of properties including long shelf life, the ability to withstand freezing, and a bond having good shear and relatively low tensile strength.

There are numerous uses of oxidized polyethylene reported in the literature. Most of these uses are concerned with forming an emulsion for use in coating various substrates such as coatings for fruit such as apples, polishes for floors and the finishes of furniture and automobiles, and treating of cloth to provide sewability and abrasion resistance and the like. Heretofore, oxidized polyethylene has not been used in an adhesive composition to adhere or bond two surfaces. It was, therefore, unexpected that the emulsions of this invention would provide an adhesive composition having a novel combination of properties.

The polyethylenes useful in the compositions of this invention are oxidized polyethylene or mixtures of oxidized polyethylene having a melt viscosity in the range of about 100 cp. to about 3500 cp. (125° C., Brookfield), preferably about 200 cp. to about 1500 cp., an inherent viscosity of about 0.05 to 0.5 [Schulhen and Sparks, J. Polymer Sci. 26, 227, (1957)] and an acid number of about 4 to about 30 (ASTM-D-1386-59), preferably about 12 to about 18. These oxidized polyethylenes are prepared from thermally degraded polyethylenes prepared by conventional polymerization processes for preparing low, medium and high density polyethylene. These degraded polyethylenes are oxidized to prepare the oxidized polyethylene used in the present invention. The oxidized polyethylenes are well known in the art and methods for preparing such oxidized polyethylenes are well known and disclosed in the art. For example, U.S. Pat. Nos. 3,160,621 and 3,519,588 disclose emulsifiable polyethylenes useful in the present invention and methods of preparation. These polyethylenes can be used in amounts of about 5 percent to about 35 percent by weight, preferably about 10 to about 25, of the emulsion.

The tackifying resins useful in the compositions of this invention can be a hydrocarbon resin such as DAC-B hydrocarbon resin prepared according to the process disclosed in U.S. Pat. No. 3,701,760 as well as other hydrocarbon resins, polyterpenes or terpene polymers, rosin esters and the like. One such hydrocarbon tackifying resin is a hydrocarbon resin having a softening point of 100° C. and available commercially as "Resin H-100" from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 5° to 125° C.; an acid number of from 0 to 2; and an iodine value of from about 75 to 125. Examples of such commercially available resins of this type are "Wingtack" 10 and "Wingtack" 95 as sold by the Goodyear Tire and Rubber Company and the Sta-Tac and Betaprene 14 resins sold by the Reichhold Chemical Corporation.

Also suitable tackifying resins are the polyterpenes or terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful materials for preparing the tackifying materials are terpene mixtures containing at least 20 percent beta-pinene and/or limonene or dipentene (racemic limonene), and the "sulfate turpentine" obtained as a by-product in the sulfate pulping process. Other suitable tackifying resins are the rosin esters which include ethylene glycol, polyethylene glycol, glycerol and pentaerythritol rosin esters, hydrogenated rosin esters or methylated rosin esters, for example, the commercially available materials "Staybelite" Ester 3 triethylene glycol ester of hydrogenated rosin, "Foral" 85 and 105 highly stabilized ester resins of pentaerythritol and rosin base.

The tackifying resins, such as hydrocarbon resins, polyterpenes, and rosin esters, can be used either alone or in mixtures of such resins. The choice of tackifying resin or resins will depend on the particular combination of properties such as tackiness and peel strength desired in the emulsifiable adhesive. The tackifying resin portion of the adhesive is in an amount of about 10 percent to about 50 percent by weight, preferably about 15 to about 35, of the emulsion.

The emulsifiers useful in the compositions of this invention are well known in the art and include, for example, 2-amino-2-methyl-1-propanol, morpholine, triethanolamine, and the like as well as 10 to 20 carbon atom-containing fatty acids such as oleic acid or fatty acid containing mixtures such as tall oil. Other useful emulsifiers include higher alkyl sodium sulfates and sulfonates, alkyl aromatic sodium sulfonates and the like. These emulsifiers can be used in amounts of about 5 to about 25 percent by weight, preferably about 10 to about 25, of the emulsion.

In addition to the above components, the compositions of this invention contain water in the amount of about 5 to 80 percent by weight of the emulsion, preferably about 20 to about 65 percent by weight.

The adhesive compositions of this invention can be prepared using the following procedure.
1. Melt the polyethylene, resins, and organic acid portion of the emulsifier system together and bring to a temperature of 110° to 120° C.
2. Add the organic amine and stir until the melt becomes clear (about 2 minutes).
3. While maintaining good agitation with a mechanical stirrer, add the melt to water which has been heated to about 95° C.
4. After emulsification is complete continue to stir until the adhesive has cooled to 70° C.

ROOM TEMPERATURE PEEL STRENGTH

These adhesives were evaluated for peel strength at room temperature by bonding two sheets of 20-pound Kraft paper together with a strip of adhesive 0.25-inch. wide and 0.003-inch. thick and after drying for 24 hours, separating 1-inch. wide strips at 0.1 inches per minute using an Instron tensile tester.

PALLETIZING ADHESIVE TESTS

The shear strength and degree of fiber tear on multi-wall bags were determined by applying two 2-inch diameter patches of adhesive (20-30 mils thick) to filled 50-pound bags and placing another bag on top. After 24-72 hours, the bags were checked for ease of lateral movement and for degree of tearing when separated vertically.

The invention can be further illustrated by the following examples of preferred embodiments thereof, although it will be understood that these examples are included merely for purposes of illustration and are not intended to limit the scope of the invention unless otherwise specifically indicated.

EXAMPLE 1

An emulsion adhesive was prepared by heating a blend of 25 grams Resin H-100; 25 grams Wingtack 10 and 25 grams oxidized polyethylene wax and 16 grams oleic acid to a temperature of 110° to 120° C. and thereafter adding 14 grams of 2-amino-2-methyl-1-propanol and stirring until the melt becomes clear (i.e., about 2 minutes). While maintaining good agitation with a mechanical stirrer, add the melt to 120 grams of water which has been heated to about 95° C. After emulsification is complete, continue to stir until the adhesive has cooled to about 70° C. This composition results in an adhesive with a rich creamy consistency which flows easily. When dry, the adhesive leaves a film with permanent residual tackiness. Data are presented in Table I.

EXAMPLE 2

An emulsion adhesive was prepared by heating a blend of 46 grams Resin H-100; 5 grams Wingtack 10 and 30 grams oxidized polyethylene wax and 16 grams oleic acid to a temperature of 110° to 120° C. and thereafter adding 14 grams of 2-amino-2-methyl-1-propanol and stirring until the melt becomes clear (i.e., about 2 minutes). While maintaining good agitation with a mechanical stirrer, add the melt to 130 grams of water which has been heated to about 95° C. After emulsification is complete, continue to stir until the adhesive has cooled to about 70° C. This composition results in an adhesive of about the same consistency of Example 1. When dry, the adhesive leaves a film with only a slight amount of tackiness. Data are presented in Table I.

EXAMPLE 3

An emulsion adhesive was prepared by heating a blend of 40 grams Resin H-100; 10 grams Wingtack 10 and 30 grams oxidized polyethylene wax and 16 grams oleic acid to a temperature of 110° to 120° C. and thereafter adding 14 grams of 2-amino-2-methyl-1-propanol and stirring until the melt becomes clear (i.e., about 2 minutes). While maintaining good agitation with a mechanical stirrer, add the melt to 40 grams of water which has been heated to about 95° C. After emulsification is complete, continue to stir until the adhesive has cooled to about 70° C. This composition results in an adhesive with the consistency of a thick paste and does not flow under gravity. It leaves a film with a slight degree of tackiness. Data are presented in Table I.

EXAMPLE 4

An emulsion adhesive was prepared by heating a blend of 40 grams Resin H-100; and 40 grams oxidized polyethylene wax and 16 grams oleic acid to a temperature of 110° to 120° C. and thereafter adding 14 grams of 2-amino-2-methyl-1-propanol and stirring until the melt becomes clear (i.e., about 2 minutes). While maintaining good agitation with a mechanical stirrer, add the melt to 120 grams of water which has been heated to about 95° C. After emulsification is complete, continue to stir until the adhesive has cooled to about 70° C. This composition results in an adhesive having the rich creamy consistency of Examples 1 and 2. After drying, it leaves a film with very little residual tackiness. Data are presented in Table I.

Table I

| Evaluation of Adhesive Emulsions | | | | |
|---|---|---|---|---|
| | 1 | 2 | 3 | 4 |
| Example: Property; | | | | |
| Room Temperature Peel Strength, g. | 600 | 350 | 350 | 100 |
| Lateral Movement on Bags | None | None | None | None |
| Fiber Tear on Bags, % | 25 | 10 | 10 | 0 |
| Physical Form | Thick Liquid | Thick Liquid | Paste | Thick Liquid |
| Effect of Freeze-Thaw (0° F.–73° F.) | | None | | |
| pH | | 10–11 | | |

EXAMPLE 5

The shelf life and the effect of a freeze-thaw cycle were determined on the composition of Example 2 and on two commercial water-borne emulsion adhesives. Results are shown below.

|  | Composition Example 2 | Findley's 780-683 | Chemionic's Chemtac P820L |
| --- | --- | --- | --- |
| Shelf Life | >1 yr. | 6 months | 6 months |
| Effect of Freeze-Thaw (0° -73° F.) | None | Destroyed Emulsion | Destroyed Emulsion |

As noted hereinbefore, there are many uses for emulsion adhesives such as bonding together of porous substrates such as paper and wood. The adhesives of this invention are particularly well suited to applications which require high shear and low tensile strength. As an example, one of these compositions is being used as a palletizing adhesive. This application involves applying the adhesive between layers of bags or boxes to prevent shifting or sliding during shipment. This requires an adhesive with good shear strength. However, it is desirable when the bags or boxes are unstacked that the adhesive fail rather than produce much container tear. This requires an adhesive with low tensile strength. The adhesives of this invention have these unique properties and provide a commercially useful palletizing adhesive.

Another application in which these adhesives are useful is in bonding of paper articles such as is often done in schools and offices. These adhesives can be made to apply as a liquid or as a paste, depending on the amount of water used.

Although the invention has been described in considerable detail with particular reference to certain preferred embodiments thereof, variations and modifications can be effected within the spirit and scope of the invention.

I claim:

1. An adhesive composition comprising an emulsion of (1) 5 to 35 weight percent oxidized polyethylene having a melt viscosity in the range of about 200 cp. to about 1500 cp., an inherent viscosity of about 0.05 to 0.5 and an acid number of about 4 to 30, (2) 10 to 50 weight percent of at least one tackifying resin selected from the group consisting of hydrocarbon resins and polyterpene resins (3) 5 to 25 weight percent emulsifiers and (4) 5 to 80 weight percent water.

2. An adhesive composition comprising an emulsion of (1) 10 to 25 weight percent oxidized polyethylene having a melt viscosity in the range of about 200 cp. to about 1500 cp., an inherent viscosity of about 0.05 to 0.5 and an acid number of about 4 to 30, (2) 15 to 35 weight percent of at least one tackifying resin selected from the group consisting of hydrocarbon resins and polyterpene resins, (3) 10 to 25 weight percent emulsifiers, and (4) 20 to 65 weight percent water.

3. An adhesive composition comprising an emulsion of (1) 5 to 35 weight percent oxidized polyethylene having a melt viscosity in the range of about 200 cp. to about 1500 cp., an inherent viscosity of about 0.05 to 0.5 and an acid number of about 12 to 17, (2) 10 to 50 weight percent of a tackifying resin comprising at least one hydrocarbon resin having a softening point of about 100° C., (3) 5 to 25 weight percent emulsifiers and (4) 5 to 80 weight percent water.

4. An adhesive composition comprising an emulsion of (1) 5 to 35 weight percent oxidized polyethylene having a melt viscosity in the range of about 200 cp. to about 1500 cp., an inherent viscosity of about 0.05 to 0.5 and an acid number of about 12 to 17, (2) 10 to 50 weight percent of a tackifying resin comprising a mixture of hydrocarbon resins, (3) 5 to 25 weight percent emulsifiers and (4) 5 to 80 weight percent water.

5. An adhesive composition comprising an emulsion of (1) 10 to 25 weight percent oxidized polyethylene having a melt viscosity in the range of about 200 cp. to about 1500 cp., an inherent viscosity of about 0.05 to 0.5 and an acid number of about 12 to 17, (2) 15 to 35 weight percent of a tackifying resin comprising at least one hydrocarbon resin having a softening point of about 100° C., (3) 10 to 25 weight percent emulsifiers and (4) 20 to 65 weight percent water.

6. An adhesive composition comprising an emulsion of (1) 10 to 25 weight percent oxidized polyethylene having a melt viscosity in the range of about 200 cp. to about 1500 cp., an inherent viscosity of about 0.05 to 0.5 and an acid number of about 12 to 17, (2) 15 to 35 weight percent of a tackifying resin comprising a mixture of hydrocarbon resins, (3) 10 to 25 weight percent emulsifiers and (4) 20 to 65 weight percent water.

* * * * *